United States Patent [19]

Nagai et al.

[11] Patent Number: 5,213,385
[45] Date of Patent: May 25, 1993

[54] DETACHABLE SUCTION PAD ASSEMBLY

[75] Inventors: Shigekazu Nagai; Shuuzou Sakurai; Tadasu Kawamoto; Masahisa Hasegawa, all of Ibaraki, Japan

[73] Assignee: SMC Kabushiki Kaisha, Tokyo, Japan

[21] Appl. No.: 787,631

[22] Filed: Nov. 4, 1991

[30] Foreign Application Priority Data

Nov. 9, 1990 [JP] Japan .................. 2-305808

[51] Int. Cl.⁵ .................. B25J 15/06; B66C 1/02
[52] U.S. Cl. .................. 294/64.1
[58] Field of Search .................. 294/64.1-64.3, 294/65; 248/362, 363; 269/21; 271/90, 94, 103-106; 285/18, 21, 31, 89, 138, 239, 284, 363, 374, 399, 405, 414

[56] References Cited

U.S. PATENT DOCUMENTS

| | | | |
|---|---|---|---|
| 1,457,776 | 6/1923 | Henderson | 294/64.1 |
| 3,272,549 | 9/1966 | Nisula | 294/64.1 |
| 3,993,301 | 11/1976 | Vits | 294/64.1 X |
| 4,486,013 | 12/1984 | Syde | 294/64.1 X |
| 4,582,353 | 4/1986 | Alvernhe | 294/64.1 |

FOREIGN PATENT DOCUMENTS

| | | | |
|---|---|---|---|
| 1948090 | 3/1971 | Fed. Rep. of Germany | 294/64.1 |
| 3518640 | 11/1986 | Fed. Rep. of Germany | 294/64.1 |
| 302221 | 4/1971 | U.S.S.R. | 294/64.1 |
| 1007706 | 10/1965 | United Kingdom | |
| 1109717 | 4/1968 | United Kingdom | |
| 1143216 | 2/1969 | United Kingdom | |
| 1213529 | 11/1970 | United Kingdom | |

*Primary Examiner*—Johnny D. Cherry
*Attorney, Agent, or Firm*—Oblon, Spivak, McClelland, Maier & Neustadt

[57] ABSTRACT

A suction pad assembly for holding a work by suction includes a suction pad and a connector. The suction pad comprises a root part connected to a vacuum and suction source through the connector and a skirt part integrally joined to the root part. The connector has an entirely protrudent part in a noncircular form in transverse section. The root part has a recess into which the noncircularly protrudent part of the connector is fitted. Alternatively, the root part has an entirely protrudent part in a noncircular form in transverse section and the connector has a recess in a noncircular form in transverse section, into which the protrudent part of the root part is fitted. A process for the production of the suction pad assembly comprises forming a skirt part of a suction pad body thinly so as to conform to the shape of the surface of a work and at the same time, forming a recess or protrudent part in or on a root part of the suction pad body; causing the skirt part to conform to the shape of the surface of the work; hardening the skirt part in a state that the skirt part has been caused to conform to the shape of the surface of the work; and then fitting a protrudent part or recess of a connector into or over the recess or protrudent part of the root part to integrate the connector and suction pad body with each other.

3 Claims, 6 Drawing Sheets

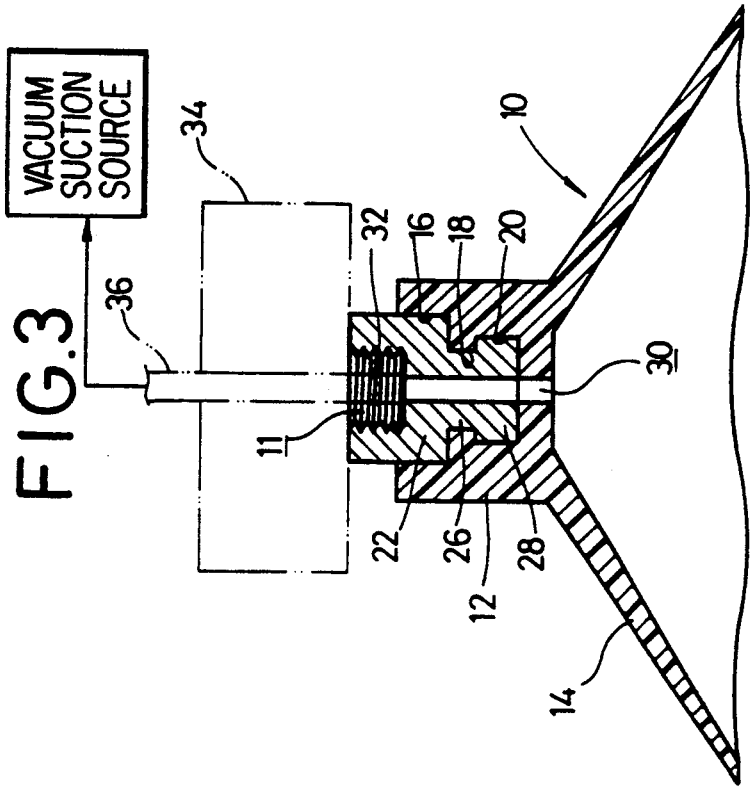
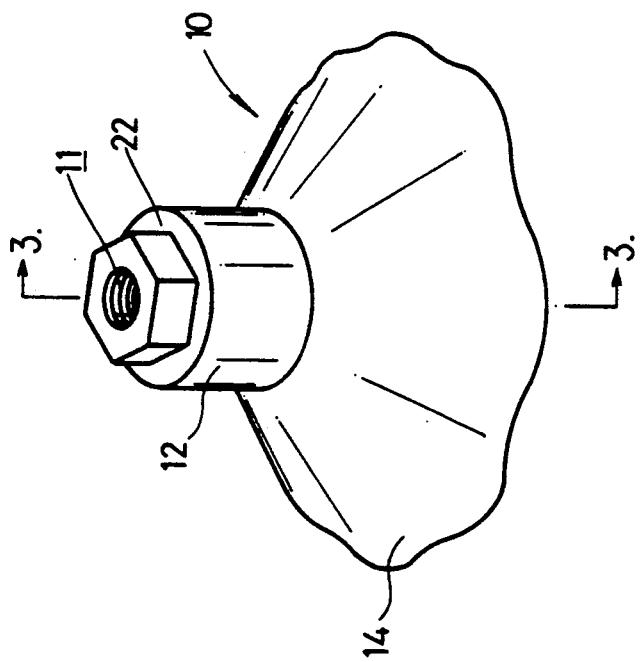

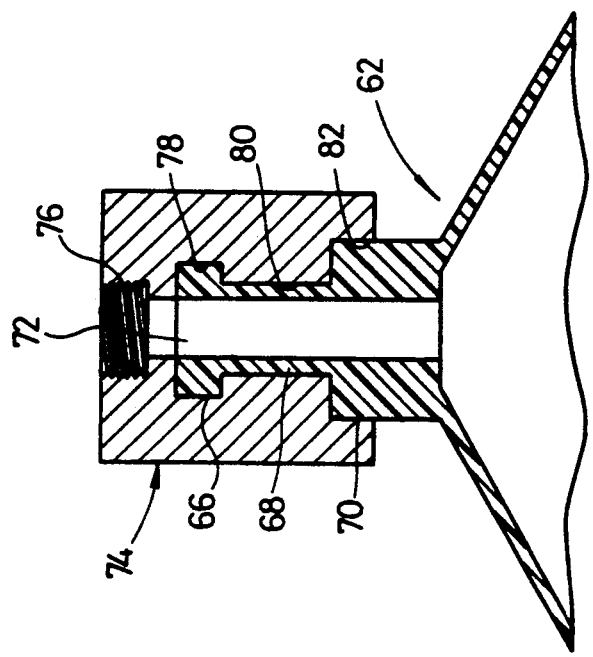
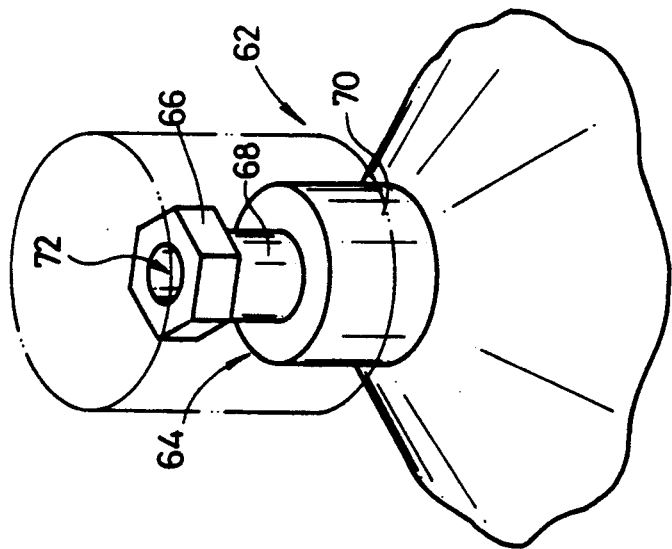

DETACHABLE SUCTION PAD ASSEMBLY

FIELD OF THE INVENTION

The present invention relates to a suction pad assembly, which serves to hold a work by suction and then convey it to an optional position, and a production process thereof.

BACKGROUND OF THE INVENTION

In order to convey, for example, works in the form of a thin plate, there have heretofore been used suction pads connected to a vacuum and suction source. A suction pad of this kind generally comprises a root part and a skirt part integrally joined thereto, is installed on an arm of a robot through a fitting and is utilized for the conveyance of works or the like.

At that time, a tube from the vacuum and suction source is connected to the root part of the suction pad to suck air from the interior of the suction pad, whereby the work is held by the suction pad under a pressure reducing action of the skirt part.

Operation of a suction pad according to such prior art will hereinafter be described with reference to FIG. 1.

Reference character 2 designates a suction pad. The section pad 2 comprises a cylindrical root part 4 connected to a vacuum and suction source (not illustrated) and a skirt part 6 integrally joined to the root part 4.

When a work 8 is to be conveyed, the suction pad 2 is installed on an arm of a robot (not illustrated) so as to displace the suction pad 2 by the robot, thereby bringing the peripheral edge of the skirt part 6 into close contact with the work 8. A vacuum and suction source (not illustrated) is then operated to reduce the pressure within the suction pad 2, whereby the suction pad 2 holds the work by suction and then conveys the same.

However, a fitting to be connected to the suction pad 2 is generally rotatably inserted in a hole defined in the root part 4 of the suction pad 2 to connect them to each other. Therefore, angular moment generates about an axis of the suction pad 2 as the robot arm (not illustrated) angularly moves upon the conveyance of the work 8. Accordingly, the suction pad 2 rotates and hence, the work 8 held to the suction pad 2 also rotates, so that exact positioning of the work 8 becomes difficult. In particular, when a work 8 having a particular shape is conveyed and then intended to position on a predetermined site, as described below, this positioning becomes substantially difficult if the suction pad rotates.

As a method of preventing the angular movement of the suction pad 2, it is considered to fixedly attach the fitting, for example, by coating and baking an adhesive. However, this method causes the following inconvenience. Namely, when the exchange of the suction pad 2 is attempted according to the kind, size, etc. of the work, it is often required to exchange the fitting fixed to the suction pad 2, also. Therefore, it is substantially impossible to exchange the suction pad 2 alone.

For this reason, fittings must be always provided according to the number of suction pads. There are also pointed out disadvantages of increase in the number of spare parts, complicated inventory control, etc.

In addition, there is a problem that although the skirt part 6 of the suction pad 2 is somewhat flexible, the suction pad 2 does not come into close contact with the work 2 as illustrated in FIG. 1 if the work 2 has a rough surface. Therefore, the pressure within the suction pad 2 can not be reduced even under the pressure reducing action by the vacuum and suction source, so that sufficient suction force can not be provided.

Accordingly, a mold has been fabricated in such a manner that the skirt part 6 conforms to the shape of the work 8 to cope with such a problem. However, such a measure causes an inconvenience of requiring many steps.

SUMMARY OF THE INVENTION

It is a general object of this invention to provide a suction pad assembly by which inventory control becomes easy and the number of spare parts is not increased, and a production process thereof.

It is a principal object of this invention to provide a suction pad assembly, which can prevent a suction pad from rotating to exactly position a work, and a production process thereof.

Another object of this invention is to provide a suction pad assembly, in which a suction pad can be easily and detachably interlocked with a fitting, for example, a connector so as to prevent the suction pad from rotating, and a production process thereof.

A further object of this invention is to provide a suction pad assembly, in which a skirt part of a suction pad is formed in conformity to the shape of a surface of a work, thereby permitting the close contact of the suction pad with the work to satisfactorily hold the work by suction, and a production process thereof.

Still a further object of this invention is to provide a suction pad assembly for holding a work by suction, which includes a suction pad and a connector, said suction pad comprising a root part connected to a vacuum and suction source through the connector and a skirt part integrally joined to the root part, characterized in that the connector has an entirely protrudent part n a noncircular form in transverse section and the root part has a recess into which the noncircularly protrudent part of the connector is fitted, and a production process thereof.

Yet still a further object of this invention is to provide a suction pad assembly wherein the noncircularly protrudent part of the connector is in the form of a polygon and the recess of the root part is in the form of a polygon corresponding to the polygonally protrudent part, and a production process thereof.

Yet still a further object of tis invention is to provide a suction pad assembly wherein the connector has a second entirely protrudent part capable of preventing the connector from slipping out of the root part and the root part of the suction pad body has a second recess into which the second protrudent part of the connector is fitted, and a production process thereof.

Yet still a further object of this invention is to provide a suction pad assembly wherein the second protrudent part is in the form of a circle in transverse section, and the second recess, into which the second protrudent part is fitted, is also in the form of a circle in transverse section, and a production process thereof.

Yet still a further object of this invention is to provide a suction pad assembly for holding a work by suction, which includes a suction pad and a connector, said suction pad comprising a root part connected to a vacuum and suction source through the connector and a skirt part integrally joined to the root part, characterized in that the root part has an entirely protrudent part in a noncircular form in transverse section and the connector has a recess in a noncircular form in transverse section, into which the protrudent part of the root part is fitted, and a production process thereof.

Yet still a further object of this invention is to provide a suction pad assembly wherein the noncircularly protrudent part of the root part is in the form of a polygon and the recess of the connector is in the form of a polygon corresponding to the noncircularly protrudent part, and a production process thereof.

Yet still a further object of this invention is to provide a suction pad assembly wherein the noncircularly protrudent part of the root part is formed so as to prevent the root part from slipping out of the connector, and a production process thereof.

Yet still a further object of this invention s to provide a suction pad assembly wherein at least the skirt part is composed of a flexible material, and a production process thereof.

Yet still a further object of this invention is to provide a process for the production of a suction pad assembly, comprising the steps of:

the first step in which a skirt part of a suction pad body is formed thinly so as to conform to the shape of the surface of a work and at the same time, a recess or protrudent part is formed in or on a root part of the suction pad body;

the second step in which the skirt part is caused to conform to the shape of the surface of the work;

the third step in which the skirt part is hardened in a state that the skirt part has been caused to conform to the shape of the surface of the work; and the fourth step in which a protrudent part or recess of a connector is fitted into or over the recess or protrudent part of the root part to integrate the connector and suction pad body with each other.

Other objects and advantages of the present invention will be readily appreciated from the preferred embodiments of this invention, which will be described subsequently in detail on reference to the accompanying drawings.

BRIEF DESCRIPTION OF THE DRAWINGS

In the accompanying drawings:

FIG. 2 is an explanatory perspective view of a suction pad assembly according to the first embodiment of the present invention;

FIG. 3 is a vertical cross-sectional view taken along line III—III in FIG. 2;

FIG. 8 is a perspective view of a suction pad in a suction pad assembly according to the third embodiment of the present invention;

FIG. 9 is a vertical cross-sectional view of the suction pad assembly wherein a connector has been fitted over the suction pad illustrated in FIG. 8;

DETAILED DESCRIPTION OF THE PREFERRED EMBODIMENTS

The suction pad assemblies according to the present invention will hereinafter be described in detail by the preferred embodiments in connection to their production process on reference to the accompanying drawings.

FIG. 2 is a perspective view of a suction pad assembly according to the first embodiment of the present invention, wherein a connector has been fitted into a suction pad, and FIG. 3 is a vertical cross-sectional view taken along line III—III in FIG. 2.

Figure 5:
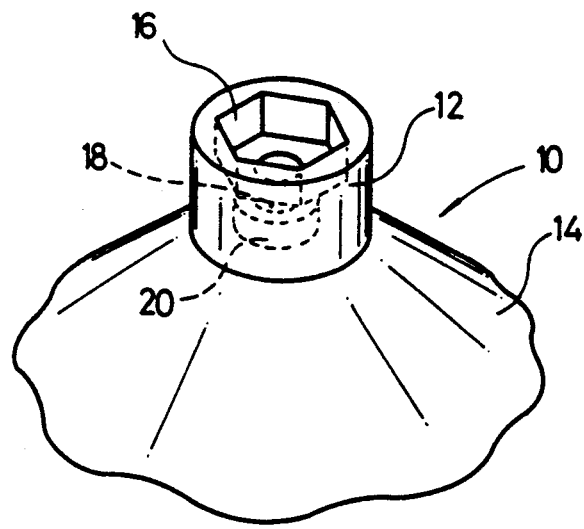
FIG. 5 is a perspective view of a suction pad in the suction pad assembly illustrated in FIGS. 2 and 3, from which the connector has been removed.

The suction pad 10 in this embodiment comprises a root part 12 connected to a vacuum and suction source and a skirt part 14 integrally joined to the root part. The root part 12 is connected to a vacuum and suction source by a tube 36 through a connector 22 having a hole 11, which is a threaded hole, and a fitting 34 with an external thread cut on the bottom thereof. As illustrated in FIG. 5, the suction pad 10 has at its root part 12 a recess 16 in the form of a hexagon in transverse section, into which an upper part 24 of the connector 22 is fitted. Holes 18 and 20 are provided in that order under the recess 16. As readily understood from FIG. 3, the hole 18 positioned on the upside is cut into a diameter thinner than that of the hole 20.

Figure 1:
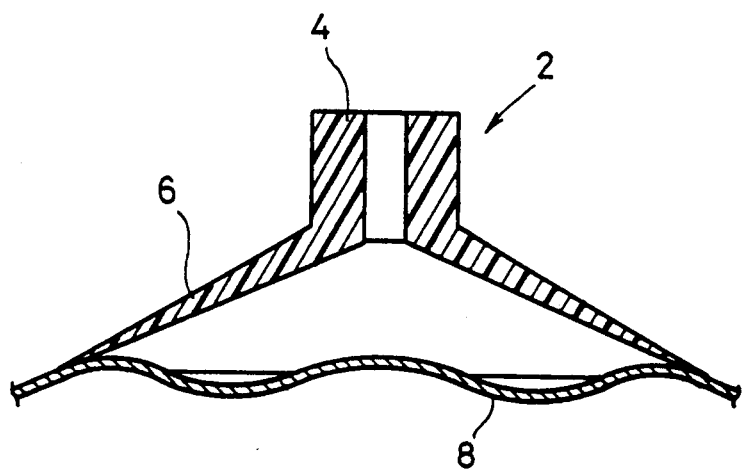
FIG. 1 is an explanatory cross-sectional view of a suction pad according to the prior art.
Figure 4:
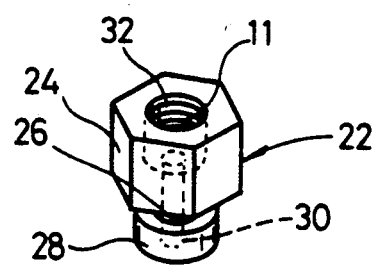
FIG. 4 is a perspective view of a connector incorporated in the suction pad assembly according to the first embodiment illustrated in FIGS. 2 and 3.

As illustrated in FIG. 4, the connector 22 is divided into an upper part 24, a middle part 26 and a lower part 28, and a through-hole 30 is caused to extend in its axial direction. The tube 36 is fitted into this through-hole 30.

The upper part 24 of the connector 22 is in the form of a hexagon in transverse section, and an internal thread 32 is provided in a wall by which the hole 11 is defined. The lower part 28 of the connector 22 is shaped into an entirely protrudent circular form so as to surely fit the connector 22 to the root part 12 and to prevent the connector 22 from slipping out of the root part 12. The middle part of the connector 26 is provided between the upper part 24 and the lower part 28, is made thinner in diameter than the upper and lower parts 24 and 28, and fulfills the role to join both upper and lower parts to each other.

The operation of the present embodiment will next be described.

In order to fit the connector 22 to the root part 12, the lower part 28 is first of all inserted from the recess 16 and caused to pass through the hole 18. In this embodiment, the suction pad 10 is formed by a synthetic resin. Therefore, the diameter of the hole 18 is expanded when the lower part 28 of the connector 22 passes through the hole 18. The lower part 28 can hence be fitted into the hole 20.

When the lower part 28 of the connector 22 is surely installed in the hole 20 as described above, the upper part 24 of the connector 22 is located in the recess 16 of the suction pad 10. The upper part 24 of the connector 22 is fitted into the recess 16 of the suction pad 10 with the vertexes of their hexagons caused to correspond to each other, thereby permitting locking of angular movement upon the conveyance of a work. At the same time, they function so as not to slip out from each other. In addition, since the suction pad 10 is high in elasticity, the connector 22 can be simply installed in and removed from the suction pad 10. As a result, the suction pad 10 by which the work has been held by suction permits exact conveyance and release of the work without changing the posture or direction of the work. Moreover, since the connector 22 in which the internal thread 32 has been cut comes into the recess 16, so that it is installed in the suction pad 10, the suction pad assembly has an advantage that it can be made small as a whole by the axial length corresponding to the recess 16.

In the above-described embodiment, both recess 16 of the suction pad 10 and upper part 24 of the connector 22 have been formed into a hexagon in transverse section. However, the same effects as described above can be achieved so long as they are in a noncircular form, for example, tetragon, other optional polygon or partially protrudent form.

The second embodiment of this invention will hereinafter be described on reference to FIGS. 6 and 7.

Figure 6:
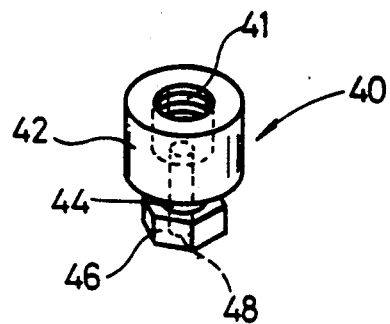
FIG. 6 is a perspective view of a connector incorporated in a suction pad assembly according to the second embodiment of the present invention.

FIG. 6 is a perspective view of a connector 40. The connector 40 has a hole 41, includes an upper part 42, a middle part 44 and a lower part 46, and has a through-hole 48 extending in the axial direction.

The second embodiment differs from the first embodiment in that the shape of the upper part 42 of the connector 40 is in the form of a circle in transverse section, while the lower part 46 is in the form of a polygon, in this embodiment, a hexagon.

Figure 7:
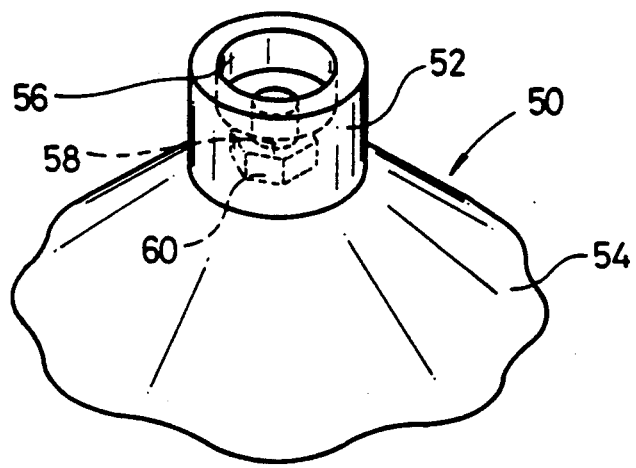
FIG. 7 is a perspective view of a suction pad in the suction pad assembly according to the second embodiment of the present invention, from which the connector has been removed.

FIG. 7 is a perspective view of a suction pad 50 used in connection with the connector 40 according to the second embodiment. In FIG. 7, a recess 56 in a root part 52 of the suction pad 50 is in the form of a circle in transverse section and a hole 60 has a hexagonal form as a section. They respectively correspond to the forms of the upper part 42 and lower part 46 of the connector 40.

According to this embodiment, the connector 40 illustrated in FIG. 6 is fitted into the suction pad 50 showed in FIG. 7, whereby the hexagonal lower part 46 of the connector 40 is installed in the hole 60 of the suction pad 50. Therefore, they are fitted in and over with their hexagonal sections caused to correspond to each other, thereby permitting locking of angular movement. The second embodiment hence has the same operation and effects as in the first embodiment.

As with the first embodiment, the recess 56 provided in the root part 52 of the suction pad 50 interlocks with the upper part 42 of the connector 40, whereby the axial length of the suction pad assembly becomes short. It is hence possible to achieve the reduction in its size.

In the second embodiment, both lower part 46 of the connector 40 and hole 60 of the suction pad 50 have been formed into a polygon in transverse section. However, it is only necessary for them to have a noncircular form like the first embodiment.

The third embodiment of this invention will hereinafter be described on reference to FIGS. 8 and 9.

FIG. 8 is a perspective view of a suction pad 62. The suction pad 62 has an entirely protrudent part in the form of a polygon, for example, a hexagon at an upper part 66 of a root part 64, includes a middle part 68 in the form of a circle in transverse section and a lower part 70, which is also circular in section but has a diameter thicker than that of the middle part 68, and is provided with a through-hole 72 extending through the upper part 66, the middle part 68 and the lower part 70 in the axial direction.

FIG. 9 is a vertical cross-sectional view of a suction pad assembly wherein a connector 74 has been fitted over the suction pad 62 illustrated in FIG. 8.

In an upper part of the connector 74, an internal thread 76 is provided in order to connect a fitting thereto. The connector 74 has a hole 78 in the form of a hexagon in transverse section for fitting the hexagonal protrudent part 66 therein and another hole 80 in the form of a circle in transverse section for preventing the protrudent part 66 from slipping out therefrom. On the lower side of the connector 74, there is provided a recess 82 interlocking with the lower part 70 of the root part 64 of the suction pad 62.

The third embodiment differs from the above-described first or second embodiment in that the above-described embodiment has adopted the internal constitution in which the connector is fitted into the interior of the root part of the suction pad, while this embodiment has taken a constitution wherein the protrudent part 66 formed on the root part 64 of the suction pad 62 is fitted into the hole 78 within the connector 74.

Therefore, the hexagonal protrudent part 66 of the root part 64 is inserted in the connector 74 and fitted into the hole 78 having a section corresponding to the hexagonal shape of the protrudent part 66, thereby permitting locking of angular movement. The middle part 68 of the root part 64 functions as a member for preventing the protrudent part 66 from slipping out by fitting in the hole 80 of the connector 74. As with the first and second embodiments, the recess 82 of the connector 74 interlocks with the lower part 70 of the root part 64, whereby the axial length of the suction pad assembly is made shorter. It is hence possible to achieve the reduction in its size.

Then, a production process of a suction pad suitable for use in each of the above-described embodiments will be described.

Figure 10:
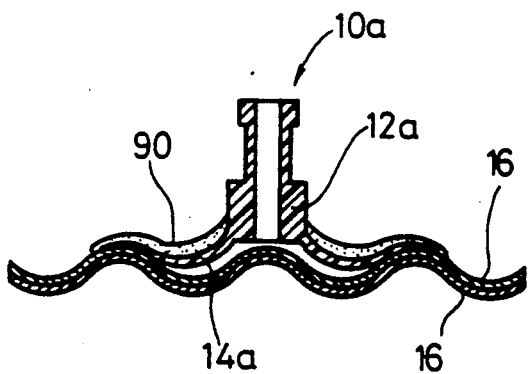
FIG. 10 is an explanatory cross-sectional view illustrating the first step in the production process of a suction pad assembly according to the present invention.

In FIG. 10, reference character 10a designates a preform of the suction pad 10 illustrated in FIGS. 2 and 3. The preform 10a comprises a cylindrical root part 12a connected to a vacuum and suction source (not illustrated) and a skirt part 14a integrally joined to the root part 12a. The skirt part 12a is formed softly and thinly enough to satisfactorily conform to the shape of the surface of a work W (the first step).

Figure 11:
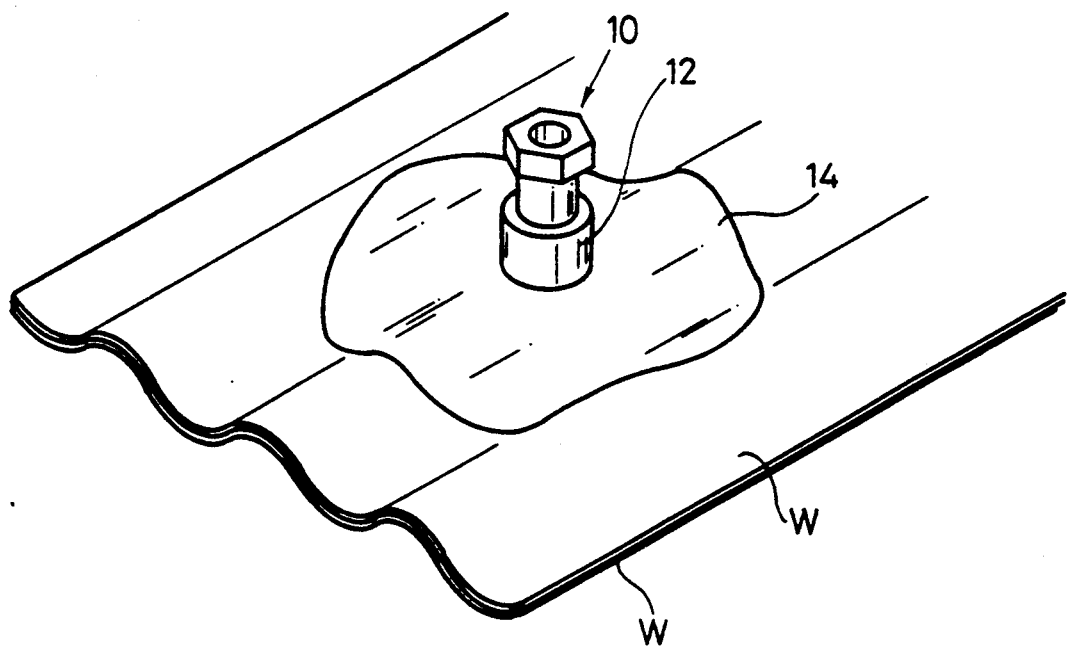
FIG. 11 is an explanatory perspective view illustrating the second step in the production process of a suction pad assembly according to the present invention.

As illustrated in FIG. 11, the preform 10a is then pressed against the work W having a rough surface, thereby causing the skirt part 14a to conform to the shape of the surface of the work W (the second step).

In this state, a coagulant or hardener 90 is coated on an outer surface of the skirt part 14a and then dried, whereby the skirt part is hardened in a state that the shape of the skirt part 14a has been caused to conform to that of the work W as shown in FIG. 11 (the third step). The suction pad 10 is completed in the above-described manner. In order to complete a suction pad assembly, it is only necessary to fit, for example, a connector 22 illustrated in FIG. 4 in or over the suction pad 10 thus formed. Namely, when the suction pad 10 thus formed is joined to the connector 22 and brought into contact with the work W, and a vacuum and suction source (not illustrated) is then operated, the peripheral edge of the skirt part 14 comes into close contact with the work W. Accordingly, it is possible to realize excellent holding and conveyance of the work W. In addition, since the action to lock angular movement is achieved between the connector 22 and the root part 12, an exactly holding and conveying process can be performed in conformity with the rough surface of the work W, in other words, in line with the directivity of the work W.

Although the skirt part 14a has been hardened so as to conform to the shape of the work W using the coagulant 90 in the above-described embodiment, it is possible to harden the skirt part 14a by a sole treatment, such as heating, ultraviolet light irradiation or cooling without using the coagulant 90 if the preform 10a itself is formed beforehand by a thermosetting or photosetting resin, or the like.

According to the present invention, as described above, the connector is fitted into or over the suction pad so as to prevent their mutual and relative rotation. Therefore, it is possible to exactly position a work without changing its posture upon the conveyance of the work by the suction pad. Besides, since the suction pad can be easily and simply removed from the connector, the suction pad can also be exchanged with ease according to the kind, size, etc. of the work. It is also unnecessary to exchange the suction pad together with the connector. Therefore, the suction pad assemblies according to the present invention have advantages such that the number of connectors can be decreased relative to the kinds of different suction pads, and inventory control can also be simplified. In addition, the suction pad can be brought into close contact with the work even when the surface of the work is uneven because the suction pad is formed while causing the skirt part of the suction pad to conform to the shape of the work. As a result, the suction pad will satisfactorily hold the work by suction.

What is claimed is

1. A suction pad assembly for holding a work by a vacuum, comprising a suction pad and a connector, said connector provided with an upper part having a non-circular cross-sectional contour, a middle part projecting from an end of the upper part, a lower part attached to the middle part, and a through-hole extending through the upper, middle and lower parts for connecting the suction pad with a vacuum suction source, a maximum diameter of the upper part being larger than a diameter of the lower part, said diameter of the lower part being larger than a diameter of the middle part, said suction pad provided with a root part and a skirt part, both made of elastic moldable material, the skirt part extending from an end of the root part to form a cavity for attracting a work by the vacuum supplied through the connector, the root part having a recess for receiving the connector at another end thereof, the recess formed by molding the lower part, the middle part and a part of the upper part of the connector integrally into the suction pad, wherein the connector is tightly fitted in the recess of the root part so that the connector is prevented from rotation with respect to the root part due to resistance caused by the noncircular cross-sectional contour of the upper part against a rotational force and prevented from being pulled out of the root part because of resistance caused by the lower part against a pulling force, whereas said connector is detachable from the root part when the connector is twisted against the root part.

2. A suction pad assembly according to claim 1, wherein said cross-sectional contour of the upper part of the connector is a polygon.

3. A suction pad assembly according to claim 1, wherein respective cross-sectional contours of the middle part and lower part of the connector are circles.

* * * * *